United States Patent [19]

Rye

[11] Patent Number: 4,767,149

[45] Date of Patent: Aug. 30, 1988

[54] PICKUP TRUCK BED LINER

[75] Inventor: Palle Rye, Reading, Pa.

[73] Assignee: Brentwood Industries, Inc., Reading, Pa.

[21] Appl. No.: 40,957

[22] Filed: Apr. 21, 1987

[51] Int. Cl.$^4$ .............................................. B62D 33/00
[52] U.S. Cl. .............................. 296/39 R; 296/24 R; 224/42.42
[58] Field of Search ................. 296/37 R, 24 R, 37.6; 224/42.42 R

[56] References Cited

U.S. PATENT DOCUMENTS

| | | | |
|---|---|---|---|
| 3,881,768 | 5/1975 | Nix | 296/37 R |
| 4,047,749 | 9/1977 | Lambitz et al. | 296/37 R |
| 4,111,481 | 9/1978 | Nix et al. | 296/37 R |
| 4,161,335 | 7/1979 | Nix et al. | 296/37 R |
| 4,162,098 | 7/1979 | Richardson, III | 296/37 R |
| 4,181,349 | 1/1980 | Nix et al. | 296/37 R |
| 4,333,678 | 6/1982 | Munoz et al. | 296/37 R |
| 4,336,963 | 6/1982 | Nix et al. | 296/37 R |
| 4,341,412 | 7/1982 | Wayne | 296/37 R |
| 4,394,100 | 7/1983 | Sperlich | 296/37 R |

OTHER PUBLICATIONS

Brochure—"1987 Ford Ranger", Cover+p. 9+Rear Cover, identified by legend on Rear Cover, FDT-8711 Litho in U.S.A., 8/86.
Brochure—"Launching a New Era in Chevy Truck History—The New 1988 Full-Size Pickup", Cover, pp. 13, 53, 57, 62 and Rear Cover, identified on p. 62 by the legend Litho in U.S.A., 4668, Feb. 1987.
Exhibit—A—Copies of Two Photographs 1987 Ford Ranger and 1988 Chevrolet Pickup.

*Primary Examiner*—Robert R. Song
*Attorney, Agent, or Firm*—Panitch Schwarze Jacobs and Nadel

[57] ABSTRACT

The present invention is directed to a truck bed liner having a front end and a rear end, the liner comprising a floor, opposed side walls having side edges joining the floor, a front wall having side edges joining the side walls and a lower edge joining the floor, and support elements associated with the side walls adapted to support a shelf member extending between the side walls within the liner above the floor. More specifically, the support elements comprise side wall portions extending within the liner between the side walls and having a horizontal upper surface adapted to support the shelf member. Preferably, retainers, which may be in the form of recesses formed in the side wall portions, are provided for retaining transverse shelf support members extending from one side wall to the other side wall.

17 Claims, 5 Drawing Sheets

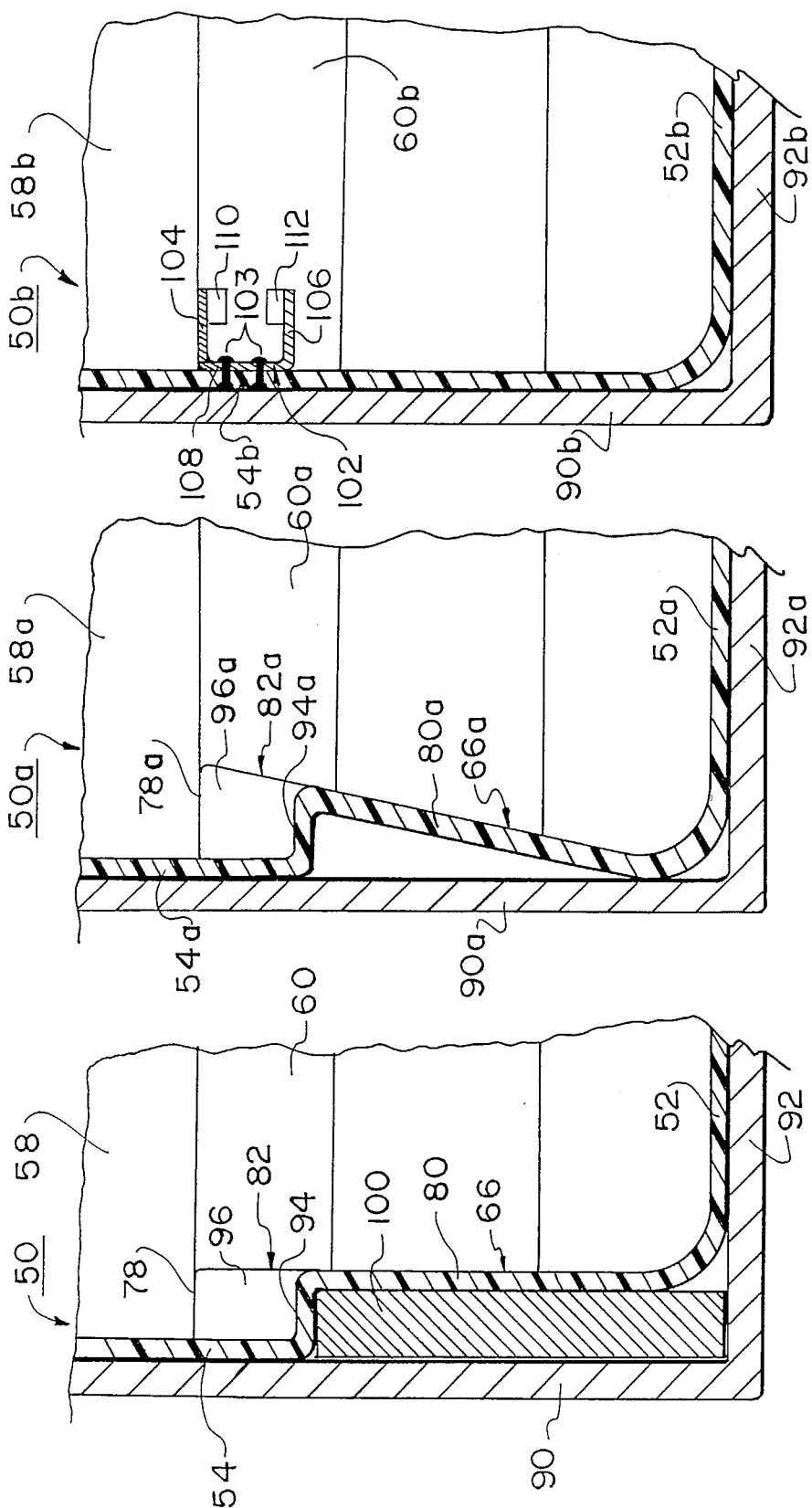

PICKUP TRUCK BED LINER

BACKGROUND OF THE INVENTION

1. Field of the Invention

This invention relates to truck bed liners. More particularly, this invention relates to protective liners preferably made out of synthetic polymeric material for use in cargo beds of trucks, such as pickup trucks, to protect the truck bed from becoming dented, scratched or prematurely worn. Preferably, the truck bed liner is vacuum formed or molded from a single piece of synthetic polymeric material.

More specifically, the present invention relates to a truck bed liner of the type described including support means associated with side walls of the liner adapted to support a shelf member extending between the side walls and above the floor of the liner. Various types of shelf support means are provided to support a shelf. By providing for a shelf within a truck bed, the effective use of the truck bed is greatly increased.

2. Description of the Prior Art

Various truck bed liners have been disclosed in prior art patents. Examples are the following U.S. patents:
U.S. Pat. No. 3,881,768 of Nix, issued May 6, 1975;
U.S. Pat. No. 4,047,749 of Lambitz et al, issued Sept. 13, 1977;
U.S. Pat. No. 4,111,481 of Nix et al, issued Sept. 5, 1978;
U.S. Pat. No. 4,161,335 of Nix et at, issued July 17, 1979;
U.S. Pat. No. 4,162,098 of Richardson, III, issued July 24, 1979;
U.S. Pat. No. 4,181,349 of Nix et al, issued Jan. 1, 1980;
U.S. Pat. No. 4,333,678 of Munoz et al, issued June 8, 1982; and
U.S. Pat. No. 4,336,963 of Nix et al, issued June 29, 1982.

Except for U.S. Pat. No. 4,162,098, which discloses only a floor liner with a short upstanding wall bordering the front and sides of the truck bed, the foregoing patents disclose various types of truck bed liners which cover the floor and substantially the entire inner walls of a truck bed.

U.S. Pat. No. 4,341,412 of Wayne, issued July 27, 1982, discloses another type of one-piece protective liner for a pickup truck or the like in which the side walls have stepped wall panels, best illustrated in FIGS. 1, 8 and 9, for the purpose of maintaining proper conformance and a close fit between the bed and the liner and to increase the strength of the side walls, while being better able to absorb impact and frictional forces during the loading and transportation of cargo.

In none of the above-identified patents and in no other prior art of which the inventor is aware is there any disclosures of means associated with the side walls of a truck bed liner for supporting a shelf so that the effective available working area of the truck bed is significantly increased.

SUMMARY OF THE INVENTION

The present invention is directed to a truck bed liner having a front end and a rear end, the liner comprising a floor, opposed side walls having side edges joining the floor, a front wall having side edges joining the side walls and a lower edge joining the floor, and support means associated with the side walls adapted to support a shelf member extending between the side walls within the liner above the floor.

More specifically, the support means comprises side wall portions extending within the liner between the side walls and having a horizontal upper surface adapted to support the shelf member. Preferably, retaining means, which may be in the form of recesses formed in the side wall portions, are provided for retaining transverse shelf support members extending from one side wall to the other side wall.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a partial vertical sectional view taken along the line 3—3 of FIG. 2 illustrating a substantially vertical portion of the truck bed liner of the present invention adjacent a side wall and floor of a truck bed and the use of a reinforcing member between a portion of the side wall of the liner and the side wall of the truck bed.

FIG. 4 is a view similar to FIG. 3 illustrating another embodiment of a truck bed liner according to the present invention having a different side wall configuration.

FIG. 5 is a view similar to FIG. 3 illustrating yet another embodiment of the present invention in which a bracket in the form of a channel member is attached to the side wall of the truck bed liner for supporting a shelf member.

DETAILED DESCRIPTION OF THE PREFERRED EMBODIMENTS

Figure 1:
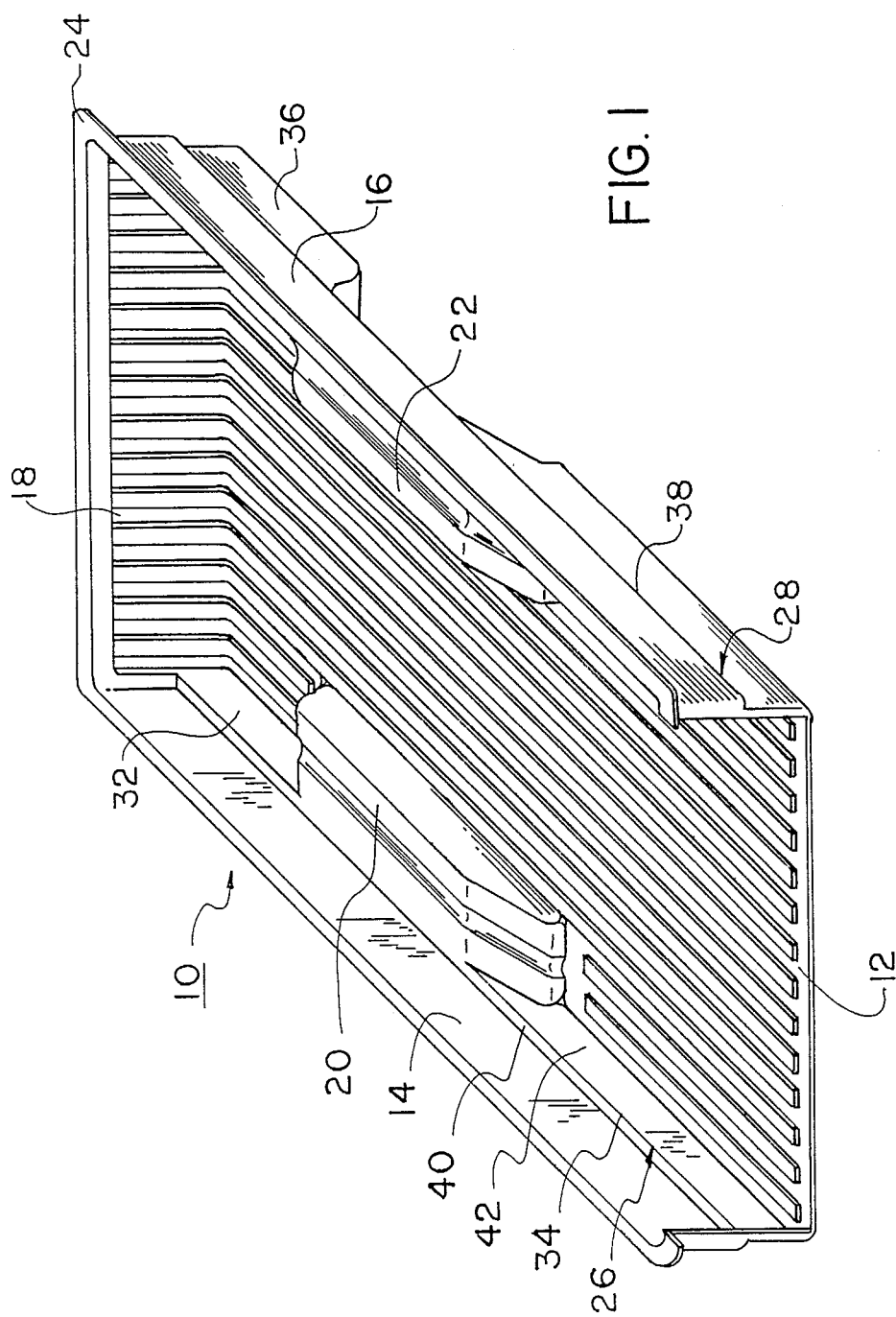
FIG. 1 is an isometric view of a first embodiment of a truck bed liner according to the present invention.

With reference to the drawings, where like reference numerals and reference letters represent like elements throughout the several views, there is shown in FIG. 1 a first embodiment of a truck bed liner 10 made in accordance with the present invention. It is preferred that the truck bed liner be a unitary molded liner vacuum formed or otherwise molded from one piece of a suitable synthetic polymeric material. Preferably, the truck bed liner of the present invention is made from high density polyethylene with or without various additives to provide for reinforcement, protection against degradation by UV light, and the like. Other synthetic resins, such as ABS, styrene, and other moldable synthetic polymers may be used to form the truck bed liner of the present invention. The initial starting thickness of the synthetic polymeric material used to form the liner preferably is about 0.25 inch.

Truck bed liner 10 comprises a floor 12, a left side wall 14, a right side wall 16 and a front wall 18. The walls are integrally formed and joined together at their respective edges as illustrated in FIG. 1. The liner is adapted to conform to truck beds having substantially vertical side bed walls of the type typically found in full size, mid size or mini pickup trucks, although the truck bed liner could also be used for other forms of truck beds, such as stake truck beds, if desired. Nevertheless, the preferred use of the present invention is to line and protect pickup truck beds.

Most modern pickup trucks have truck beds which extend laterally over the rear wheels of the pickup truck. To accommodate the wheels, pickup truck beds typically have wheel wells extending over and around the wheels. Accordingly, where liners of the present invention are used with such modern pickup truck beds having wheel wells, wheel well cover portions are molded into the liners. Thus, in FIG. 1, liner 10 includes a left wheel well cover portion 20 and a right wheel well cover portion 22.

As explained in several of the prior art patents mentioned above, it is preferred that truck bed liners include a top flange 24 which extends over and partially around the upper surfaces of the walls of the truck bed.

Liners according to the present invention may be made in standard sizes to fit into truck beds having various standard sizes and shapes. Alternately, and preferably, truck bed liners according to the present invention can be customized for use with various models of trucks to conform closely to the inner dimensions of the specific truck bed of a particular truck. The liner may be fastened in the truck bed in any suitable manner well known to those skilled in the art, such as by using the various fastening means disclosed in the prior patents mentioned above.

Figures 6, 7:
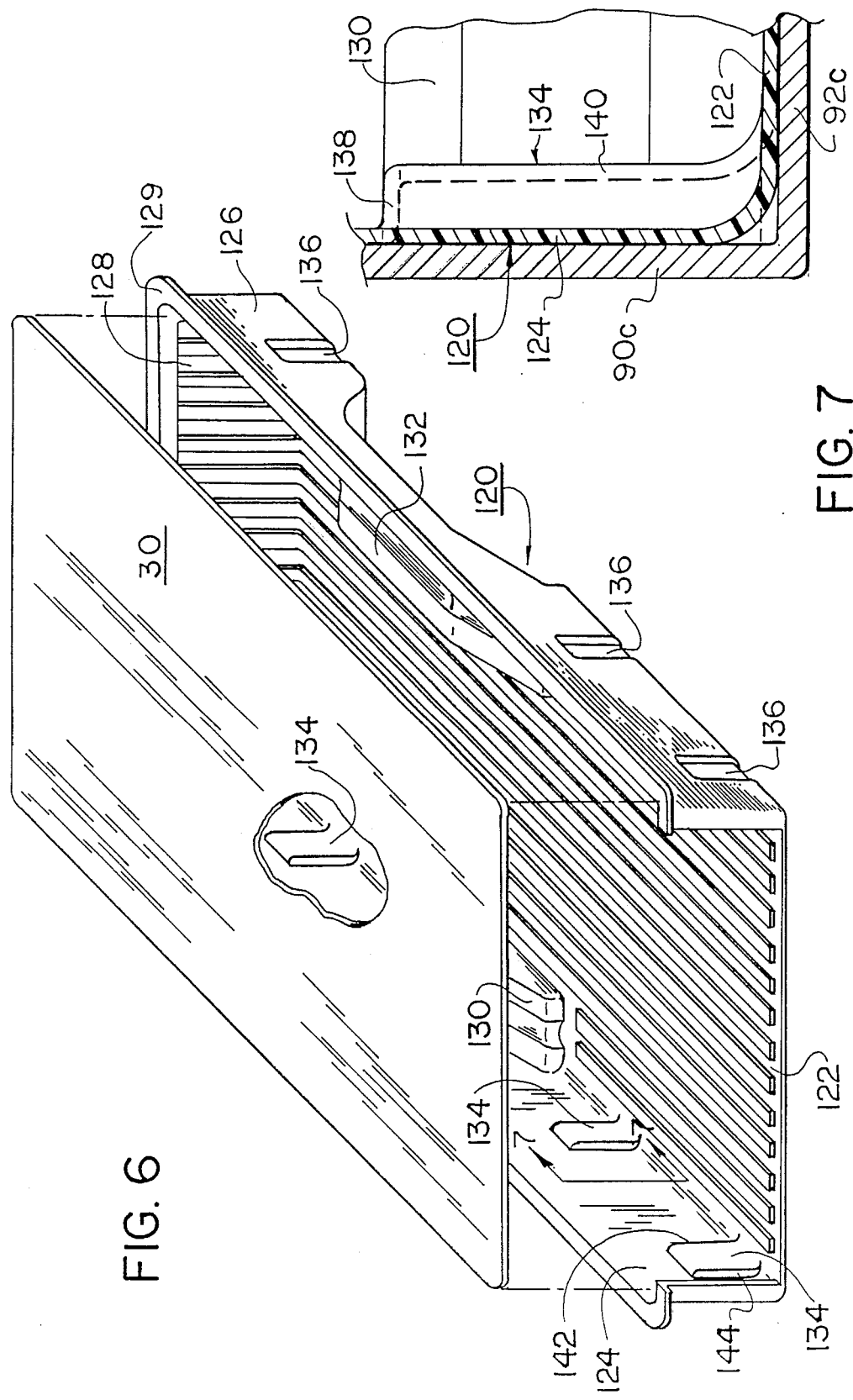
FIG. 6 is an isometric view of still another embodiment of a truck bed liner according to the present invention in which a plurality of discrete support members are formed in the side walls of the liner and further illustrating an exploded view of one embodiment of a shelf member of a type adapted to be supported within the liner of the present invention.
FIG. 7 is a partial vertical sectional view of the liner of FIG. 6 taken along line 7—7 of FIG. 6.

The truck bed liners as illustrated in all of the drawing figures have as a common feature support means to support a shelf, such as a shelf member 30 illustrated in FIG. 6. Although shelf member 30 is illustrated as extending totally between the side walls and from the front wall to the rear of the liner, the shelf member can have any dimensions so long as it is able to be supported by the support means associated with the side walls of the various embodiments of the truck liner according to the present invention.

With further reference to FIG. 1, liner 10 includes a left side shelf support means 26 and a right side shelf support means 28. Left side support means 26 includes a front portion 32 in front of wheel well cover portion 20 and a rear portion 34 behind wheel well cover portion 20. Likewise, right side support means 28 comprises a front portion 36 and a rear portion 38, respectively, in front of and behind wheel well cover portion 22.

Since liner 10 is substantially symmetrical about its longitudinal median plane, opposed side walls 14 and 16 are substantially mirror images of each other. As a result, only the left side of liner 10 will be discussed in further detail.

Support means 26 includes a horizontal upper support surface 40 formed in both the front and rear portions 32 and 34.

Horizontal upper support surface 40 must have a sufficient width to support the shelf member in a stable position. A width of at least about one inch is sufficient for most loads carried on the shelf member supported by means 26 and 28. Support means 26 also includes a downwardly extending vertical member 42. Member 42 is integrally formed with horizontal surface 40 and floor 12.

If desired, a reinforcing member, such as a wooden board, could support surface 40 from below. The reinforcing member would be dimensioned to fit between the inner surface of the wall of the truck bed and the outer surface of the liner below surface 40 and outwardly of member 42. The reinforcing member would be located under support surface 40 in the front and rear portions 32 and 34 of the support means 26. A similar arrangement is illustrated in FIG. 3 to be described hereinafter with reference to an alternate embodiment of the present invention. The reinforcing member is optional, since the support means 26 and 28 are sufficiently strong to support the shelf member by themselves and independently of the side walls of the truck bed, as illustrated in greatest detail in FIGS. 3, 4 and 7.

It is preferred that the height of horizontal upper surface 40 be the same height as the upper surface of the wheel well cover portions 20 and 22. If desired, the upper support surface 40 may be higher than the upper surface of the wheel well cover portions. However, if horizontal upper support surface 40 is lower than the upper surface of the wheel well cover portions, a large single shelf member corresponding to shelf member 30 of FIG. 6 would not be able to be supported in a stable manner within the truck bed liner. Nevertheless, the shelf member could be dimensioned to be supported by the front portions 32 and 36 of the support means 26 and 28. Likewise, another shelf member could be dimensioned to be supported only by the rear portions 34 and 38 of support means 26 and 28. It is preferred, however, that the horizontal upper support surface 40 of the shelf support means be flush with the upper surfaces of the wheel well cover portions. This will allow for the use of a large single shelf member, such as shelf member 30 to be supported within the liner and above the floor.

The shelf member to be supported may be made of any suitable material, but typically would be plywood, and has suitable dimensions to be supported by the support means associated with the side walls of the truck bed liner. The shelf member may be of any desired size in the direction from the front to back of the truck bed. Thus, the shelf member may extend substantially completely from side to side and front to back, or may extend only partially over the floor area of the liner. Moreover, the shelf member may be made of a single piece of suitably dimensioned material or may be formed of several pieces of material dimensioned as desired, so long as it is supported directly or indirectly by the shelf support means associated with the bed liner side walls.

While in most instances it would not be necessary to fasten a shelf member to support means 26 and 28, if desired, a shelf member could be so fastened by any suitable means, such as screws, for example. Usually, the shelf member will not be fastened to support means 26 and 28 so that the shelf member can be removed very readily. In this way, access to tools, lumber, equipment or other items below the shelf member can be readily accessible. The use of a shelf member dramatically increases the available storage area within a given truck bed compared to a truck bed having no shelf. Tools and equipment or other items which may be needed more often may be stored on top of the shelf, while items which are not used as frequently may be stored below the shelf. Further, different types of items or material may be stored above and below the shelf. For example, sand, stone or other building materials which may not be desired to be exposed to the weather may be stored below a shelf, while tools such as shovels, rakes, compactors or the like may be stored on top of the shelf.

Figure 2:
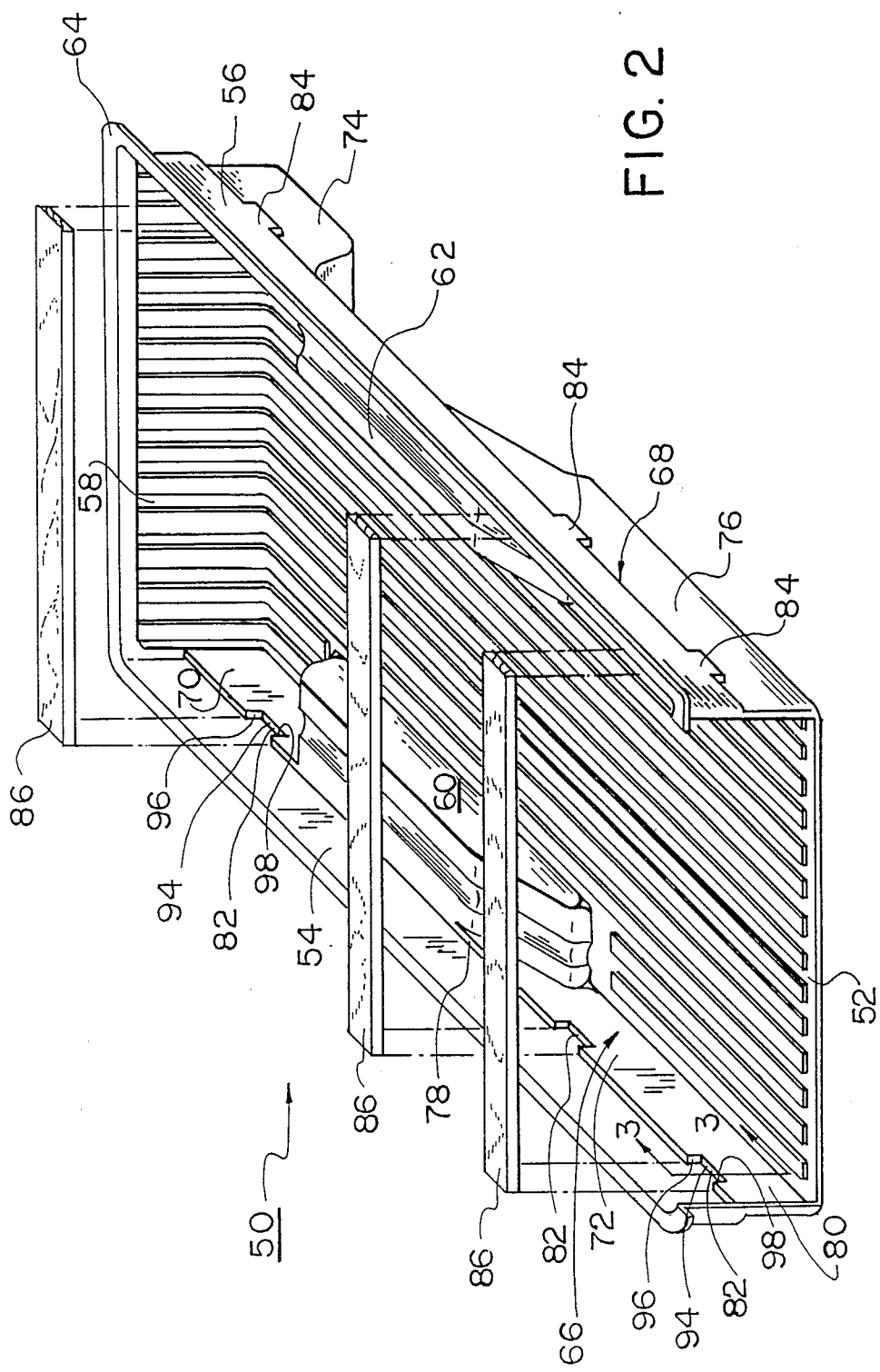
FIG. 2 is an isometric view of another embodiment of a truck bed liner according to the present invention adapted to receive transverse shelf support members within retaining means in the side walls.

FIG. 2 illustrates another, and a presently preferred embodiment 50 of a truck bed liner according to the present invention. Liner 50 comprises a floor 52, a left side wall 54, a right side wall 56 and a front wall 58. A left wheel well cover portion 60 and a right wheel well cover portion 62 are formed in the liner for the same reasons as set forth above with respect to liner 10. A top flange 64 extends around and overlaps a top edge of a truck bed into which the liner is inserted.

A shelf member such as shelf member 30 of FIG. 6 may be supported directly by left side support means 66 and right side support means 68 molded into side walls 54 and 56, respectively. Left side support means 66 includes a front portion 70 in front of wheel well cover portion 60 and a rear portion 72 behind wheel well cover portion 60. Likewise, right side support means 68 includes a front portion 74 in front of wheel well cover portion 62 and a rear portion 76 behind wheel well cover portion 62.

Since left side support means 66 and right side support means 68 are substantially mirror images of each other, the details of the support means will be described primarily with respect to left side support means 66.

The support means includes a horizontal upper support surface 78 and a downwardly extending member 80. Horizontal upper surface 78 has a width sufficient to support a shelf member 30 in a stable manner. A width of at least about one inch should suffice in most cases. Preferably, the height of horizontal upper surface 78 has the same height as the upper surfaces of wheel well cover portions 60 and 62.

In the preferred embodiment of the present invention illustrated in FIG. 2, the left side and right side support means 66 and 68 include a plurality of retaining means, preferably in the form of recesses 82 and 84 integrally vacuum formed or molded in the support means for retaining opposite ends of transverse shelf support members 86. Preferably, transverse shelf support members 86 are standard two inch by four inch boards extending between and being retained in aligned recesses in the left and right sides of the liner. By using a plurality of transverse shelf support members 86, a shelf member, such as a shelf member 30 can be supported in an even more stable manner than it could by support means 66 and 68 alone. As illustrated in FIG. 2, one support member 86 is located in front of the wheel well cover portions and two support members 86 are located behind the wheel well cover portions. Of course, the number and placement of the transverse support members would depend upon how much support is necessary or desired for the shelf member, the size of the shelf member, the size of the truck bed, the weight to be supported by the shelf members and other factors which are readily determinable and well known to those skilled in the art.

Recesses 82 and 84 are dimensioned to receive and retain opposite ends of the transverse support members to prevent the transverse support members from sliding toward the front or rear of the liner as the truck is travelling. The structure of recesses 82 and 83 will be described in more detail with reference to FIGS. 2 and 3. With particular reference to FIG. 3, liner 50 is illustrated as having a side wall 54 being adjacent to a substantially vertical side wall 90 of a truck bed and having a floor 52 supported by floor 92 of the truck bed. Recess 82 comprises a horizontal support surface 94, a recess front wall 96 and a recess rear wall 98 (illustrated in FIG. 2 only). The height of the front and rear walls 96 and 98 of recess 82 preferably corresponds to the height of transverse support members 86. In this way, the upper surfaces of the transverse support members 86 are flush with horizontal upper surface 78 of support means 66 and the upper surface of wheel well cover portion 60. Thus, a shelf member, such as shelf member 30 (FIG. 6), would be supported by all of these surfaces in a very stable manner.

FIG. 3 also illustrates the use of a reinforcing member 100 to provide additional support for horizontal support surface 94 of recess 82 in rear portion 72. A similar reinforcing member may be provided in front portion 70 of support means 66. Reinforcing member 100 may have recesses formed therein corresponding to recesses 82. Alternately, reinforcing member 100 may have a height whereby it reinforces only the horizontal support surface 94 of each recess 82.

FIG. 4 is a view similar to FIG. 3 illustrating another embodiment of a liner 50a according to the present invention corresponding generally to liner 50 illustrated in FIG. 2. Reference numerals having the letter designation "a" correspond generally to the same numbered elements without the reference letter "a" of liner 50 illustrated in FIG. 2, except where the differences are specifically stated.

As with liner 50, liner 50a includes a floor 52a, a side wall 54a and a front wall 58a. A support means 66a is integrally formed as part of the liner and includes a horizontal upper support surface 78a. A plurality of retaining means in the form of transversely aligned recesses 82a are provided in each side wall to retain transverse support members such as members 86 illustrated in FIG. 2. Recesses 82a include a horizontal support surface 94a extending between recess front wall 96a and a recess rear wall (not shown).

Unlike liner 50, however, in liner 50a, the downwardly extending portion 80a of support means 66 is not a vertical member. Rather, support means 66a includes an angled member 80a which joins with horizontal surface 94a in an acute angle. The width of surface 94a is sufficient to firmly support one end of a transverse shelf support member, such as member 86. Like surfaces 78 and 94 illustrated in FIG. 3, surface 94a should extend inwardly toward the center of the liner for a distance of at least about one inch. The width of upper horizontal support surface 78a has an even greater width extending inwardly toward the center of the liner.

FIG. 5 illustrates yet another embodiment of a liner 50b according to the present invention. Liner 50b includes a floor 52b supported by floor 92b of a truck bed, opposed side walls, only the left wall of which is illustrated as 54b, adjacent to left wall 90b of the truck bed, and a front wall 58b. Wheel well cover portions are molded into liner 50b, only one of which is illustrated at 60b. Since liner 50b is substantially symmetrical about its longitudinal median plan, only the left side wall and associated structures will be described in detail with respect to FIG. 5.

A shelf support means comprises a pair of bracket members with one of the pair mounted on each side wall. In the presently preferred embodiment, the bracket members are in the form of generally C-shaped channel members, only the left channel member being illustrated. Since the right side of liner 50b is substantially a mirror image of the left side, only the left side will be described in detail. Channel member 102 is secured by any suitable fastening means, such as rivets 103 to left side wall 54b. C-shaped channel member 102 includes an upper horizontal flange 104 and a lower horizontal flange 106 integrally formed with a vertical connecting member 108. Channel member 102 may be formed of metal, such as steel, aluminum alloy or other suitable strong material capable of supporting a shelf member, such as shelf member 30 (FIG. 6). Preferably, channel member 102 is dimensioned to receive one end of a transverse shelf support member, such as member 86 (FIG. 2) between the upper and lower flanges 104 and 106, respectively.

Channel member 102 preferably extends between front wall 58b of liner 50b and the front portion of wheel well cover portion 60b. Aligned with that channel member, another channel member 102 extends from the back of wheel well cover portion 60b to the rear of the liner. Preferably, as with the other embodiments, the upper surface of upper flange 104 is at the same height as the upper surface of wheel well cover portion 60b and any transverse support member, such as member 86, which may be retained in the channel member.

To prevent the transverse shelf support members, such as boards 86, from sliding to the front or rear of the truck within channels 102, stop means are provided. The stop means preferably are in the form of tabs 110 extending downwardly from upper flange 104 and/or tabs 112 extending upwardly from lower flange 106. Although it is only necessary to have one stop tab to the front and one stop tab to the rear of a board 86 retained within channel member 102, it is preferred to have one upper and lower tab 110 and 112 to the front and one upper and lower tab 110 and 112 to the rear of each board 86 to retain the board in the desired location. Tabs 110 and 112 preferably are formed integrally with flanges 104 and 106, respectively. If desired, the stop means for preventing the sliding of the boards within the channel could be more permanent, in the form of screws, nails or other fasteners extending through upper flange 104 or lower flange 106 into a board or other transverse support member retained within channel member 102.

FIGS. 6 and 7 illustrate still another embodiment of a truck bed liner 120 corresponding generally to the liners of the other embodiments and particularly to liner 50 illustrated in FIGS. 2 and 3. Liner 120 comprises a floor 122, a left side wall 124, a right side wall 126 and a front wall 128. A top flange 129 extends over the upper edge of a truck bed. Left and right wheel well cover portions 130 and 132 are formed in liner 120.

Shelf member 30 or any similar shelf member having different dimensions than that illustrated in FIG. 6 is supported by a plurality of discrete left side support means 134 and right side support means 136 formed in left side wall 124 and right side wall 126, respectively. Support means 134 and 136 are substantially identical and are integrally formed in the side wall at locations sufficient to support a shelf of any desired dimensions. The partial sectional view illustrated in FIG. 7 shows that floor 122 of liner 120 is supported by floor 92c of the truck bed and that side wall 124 of the liner is adjacent to side wall 90c of the truck bed. With reference to FIGS. 6 and 7, left side support means 134, which is the substantial mirror image of right side support means 136, includes an upper horizontal support surface 138 of sufficient width, such as at least about one inch, to support a shelf member 30. A downwardly extending member 140 is integrally formed with upper horizontal support surface 138, side wall 124 and floor 122. Support means 134 includes a front wall 142 and a rear wall 144 integrally formed with and joined to horizontal upper support surface 138, the inner surface of member 140, side wall 124 and floor 122.

As with the other embodiments, the height of horizontal upper surface 138 preferably is the same as the height of the upper surface of wheel well cover portions 130 and 132 so that the wheel well cover portions help support shelf member 30.

Figure 8:
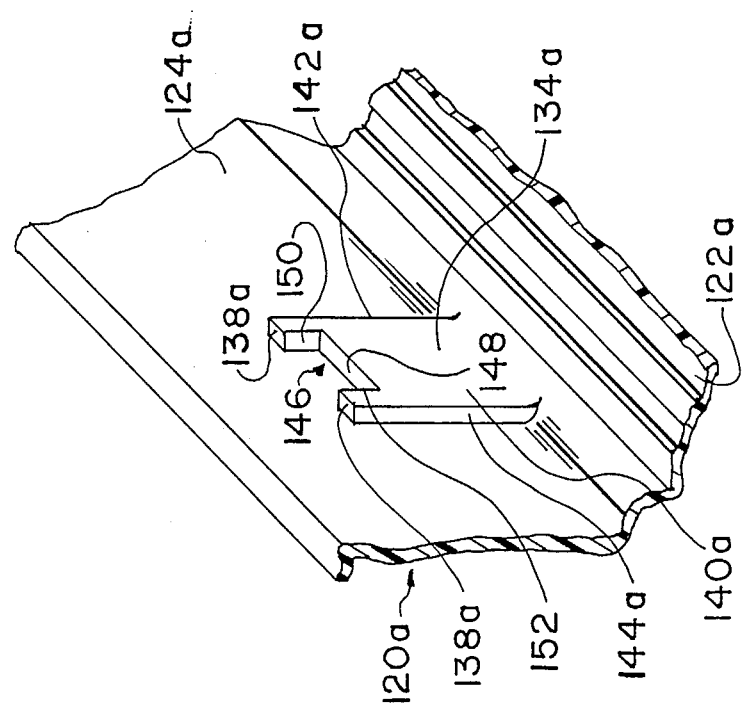
FIG. 8 is a partial isometric view of a modified form of a truck bed liner having a structure similar to FIG. 6.

FIG. 8 illustrates a portion of a modified form of liner 120a corresponding generally to liner 120 illustrated in FIGS. 6 and 7. Liner 120a has substantially the same overall construction as liner 120, with the exception that support means 134a of liner 120, which corresponds to support means 134 of liner 120, includes retaining means in the form of a recess 146 for retaining one end of a transverse shelf support member, such as member 86 (FIG. 2). Since each support means 134a should be identical, only one will be described in detail.

Support means 134a includes upper horizontal support surfaces 138a having a height corresponding to the height of the wheel well cover portion. This support means also includes a downwardly extending member 140a, a front wall 142a and a rear wall 144a.

Recess 146 includes a horizontal support surface 148, a recess front wall 150 and a recess rear wall 152. Recess 146 is dimensioned to receive a transverse shelf support member having a height such that the upper surface of the transverse support member is flush with surfaces 138 and the upper surfaces of the wheel well cover portions.

The present invention may be embodied in other specific forms without departing from the spirit or essential attributes thereof, and accordingly, reference should be made to the appended claims, rather than to the foregoing specification, as indicating the scope of the invention.

I claim:

1. A truck bed liner for use in lining a truck bed having substantially vertical opposed side bed walls, the liner having a front end and a rear end, the liner comprising a floor, opposed side walls having lower edges joining the floor, a front wall having side edges joining the side walls and a lower edge joining the floor, and support means comprising side wall portions extending inwardly within the liner and having a horizontal upper surface for supporting, independent of the side bed walls of the truck bed, a shelf member extending between the side walls within the liner above the floor.

2. A truck bed liner according to claim 1 wherein the liner is made of a single piece of synthetic polymeric material.

3. A truck bed liner according to claim 1 wherein the side wall portions have a downwardly extending vertical surface joining the horizontal upper surface.

4. A truck bed liner according to claim 1 wherein the side wall portions have a downwardly extending angled surface joining an inner edge of the horizontal surface at an acute angle.

5. A truck bed liner according to claim 1 wherein the truck bed includes wheel wells extending inwardly from the side bed walls and wherein the liner includes wheel well cover portions within the liner adapted to cover the wheel wells, each wheel well cover portion having a forward end and a back end.

6. A truck bed liner according to claim 5 wherein the side wall portions and the wheel well cover portions have a uniform height.

7. A truck bed liner according to claim 6 wherein the side wall portions extend along each side wall from the front wall to the forward end of the wheel well cover portion and from the back end of the wheel well cover portion to the rear end of the liner.

8. A truck bed liner according to claim 6 wherein the side wall portions are formed in the side walls at discrete locations and do not extend completely from the front wall to the forward end of the wheel well cover portion or completely from the back end of the wheel well cover portion to the rear end of the liner.

9. A truck bed liner according to claim 1 wherein the support means includes retaining means for retaining transverse shelf support members which extend from one side wall to the other side wall.

10. A truck bed liner according to claim 9 wherein the retaining means comprises recesses formed in the side wall portions, each recess being dimensioned to receive and retain one end of a transverse shelf support member.

11. A truck bed liner according to claim 10 wherein the recesses in opposite side walls are aligned transversely with each other.

12. A truck bed liner according to claim 10 wherein the recesses are dimensioned to receive transverse shelf support members in such a way that upper surfaces of the transverse support members are flush with the upper surfaces of the support means.

13. A truck bed liner having a front end and a rear end, the liner comprising a floor, opposed side walls having lower edges joining the floor, a front wall having side edges joining the side walls and a lower edge joining the floor, and support means associated with the side walls adapted to support a shelf member extending between the side walls within the liner above the floor, and support means comprising generally C-shaped channel bracket member having upper and lower horizontal flanges connected to opposite ends of a vertical connecting member.

14. A truck bed liner according to claim 13 wherein the channel members include retaining means for retaining transverse shelf support members which extend from one side wall to the other side wall.

15. A truck bed liner according to claim 14 wherein the retaining means includes stop means associated with the channel member for preventing the transverse support members from shifting to the front and rear ends of the liner.

16. A truck bed liner according to claim 15 wherein the stop means comprises tabs extending within the channel member, the tabs being formed from at least one of the upper and lower horizontal flanges.

17. A truck bed liner according to claim 3 further comprising a support means reinforcing member disposed below the horinzontal upper support surface and between the downwardly extending vertical surface and the adjacent side bed wall.

* * * * *